United States Patent
Irie

(10) Patent No.: US 9,607,209 B2
(45) Date of Patent: Mar. 28, 2017

(54) IMAGE PROCESSING DEVICE, INFORMATION GENERATION DEVICE, IMAGE PROCESSING METHOD, INFORMATION GENERATION METHOD, CONTROL PROGRAM, AND RECORDING MEDIUM FOR IDENTIFYING FACIAL FEATURES OF AN IMAGE BASED ON ANOTHER IMAGE

(75) Inventor: Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 164 days.

(21) Appl. No.: 14/122,600

(22) PCT Filed: Mar. 14, 2012

(86) PCT No.: PCT/JP2012/056516
§ 371 (c)(1),
(2), (4) Date: Nov. 26, 2013

(87) PCT Pub. No.: WO2012/169251
PCT Pub. Date: Dec. 13, 2012

(65) Prior Publication Data
US 2014/0105487 A1    Apr. 17, 2014

(30) Foreign Application Priority Data
Jun. 7, 2011    (JP) ................. 2011-127755

(51) Int. Cl.
G06K 9/00    (2006.01)
G06K 9/46    (2006.01)
G06K 9/66    (2006.01)

(52) U.S. Cl.
CPC ..... G06K 9/00281 (2013.01); G06K 9/00308 (2013.01); G06K 9/46 (2013.01); G06K 9/66 (2013.01)

(58) Field of Classification Search
None
See application file for complete search history.

(56) References Cited

U.S. PATENT DOCUMENTS 6,606,397 B1 *   8/2003   Yamamoto ............. A61B 3/113
                                                                 340/575
9,111,176 B2 *   8/2015   Hamada ............... G06K 9/6211
(Continued)

FOREIGN PATENT DOCUMENTS

EP    1811456 A1    7/2007
JP    09-006964    1/1997
(Continued)

OTHER PUBLICATIONS

Training-Free—Kernels. Seo et al., IEEE, 0162-8828, 2010, pp. 1688-1704.*
(Continued)

*Primary Examiner* — Jayesh A Patel
(74) *Attorney, Agent, or Firm* — Nutter McClennen & Fish LLP; John J. Penny, Jr.; Ashley T. Brzezinski

(57) ABSTRACT

A feature value extraction section extracts a feature value from a pixel or a group of pixels of a sampling point for every plurality of sampling points for a reference point with respect to a region point on an image, and extracts a group of feature values with respect to the reference point; the location information identification section references an LRF function indicating a correspondence of the group of feature values with respect to the reference point and the location information indicating a relative location of the region point with respect to the reference point to identify the location information corresponding to the group of feature values extracted by the feature value extraction section, and the region point identification section assumes the location indicated by the location information identified
(Continued)

by the location information identification section as a region point of the object.

17 Claims, 11 Drawing Sheets

(56) References Cited

U.S. PATENT DOCUMENTS

| | | | | |
|---|---|---|---|---|
| 2004/0141657 A1* | 7/2004 | Jarman | ............... | G06K 9/0061 382/275 |
| 2007/0086652 A1* | 4/2007 | Park | ................... | G06K 9/00248 382/167 |
| 2007/0242856 A1* | 10/2007 | Suzuki | ............... | G06K 9/00275 382/103 |
| 2008/0137918 A1* | 6/2008 | Eura | ................... | G06K 9/6255 382/118 |

FOREIGN PATENT DOCUMENTS

| | | |
|---|---|---|
| JP | 2005339288 A | 12/2005 |
| JP | 04-093273 B2 | 6/2008 |
| JP | 04-501937 B2 | 7/2010 |

OTHER PUBLICATIONS

Training-Free- Kernels. Seo et al., IEEE, 0162-8828, 2010, pp. 1688-1704.*
Cootes et al., Active Shape Models—Their Training and Application. Computer Vision and Image Understanding. vol. 61, No. 1, Jan., pp. 38-59, 1995.
Cootes, et al., Active Appearance Models. Ed.s Burkhardt and Neumann. Wolfson Image Analysis Unit. University of Manchester. Proc Euro Conf Comp Vision 1998:2;484-98.
International Search Report for Application No. PCT/JP2012/056516, issued Apr. 24, 2012.
Chinese Office Action for Application No. 201280025429.5, issued Aug. 3, 2015 (19 pages).

* cited by examiner

Fig. 7

| Object | Region point | LRF function | Learning target region image extraction method | Normalization method | Reference point identification method | Sampling location identification method | Feature value extraction method | Location information generation method |
|---|---|---|---|---|---|---|---|---|
| Right eye | Top lid point | Y=A1X+B1 | G001 | H001 | I001 | J001 | K001 | L001 |
| | Bottom lid point | Y=A2X+B2 | G001 | H001 | I001 | J001 | K001 | L001 |
| | Inner corner point of eye | Y=A3X+B3 | G001 | H001 | I001 | J001 | K001 | L001 |
| | Tail point of eye | Y=A4X+B4 | G001 | H001 | I001 | J001 | K001 | L001 |
| | Eye point | Y=A5X+B5 | G001 | H001 | I001 | J001 | K001 | L001 |
| Left eye | Top lid point | Y=C1X+D1 | G001 | H001 | I002 | J002 | K002 | L002 |
| | Bottom lid point | Y=C2X+D2 | G001 | H001 | I002 | J002 | K002 | L002 |
| | Inner corner point of eye | Y=C3X+D3 | G001 | H001 | I002 | J002 | K002 | L002 |
| | Tail point of eye | Y=C4X+D4 | G001 | H001 | I002 | J002 | K002 | L002 |
| | Eye point | Y=C5X+D5 | G001 | H001 | I002 | J002 | K002 | L002 |
| Mouth | Left corner point of mouth | Y=E1X+F1 | G001 | H001 | I003 | J003 | K003 | L003 |
| | Right corner point of mouth | Y=E2X+F2 | G001 | H001 | I003 | J003 | K003 | L003 |
| | Upper middle point of upper lip | Y=E3X+F3 | G001 | H001 | I003 | J003 | K003 | L003 |
| | Lower middle point of upper lip | Y=E4X+F4 | G001 | H001 | I003 | J003 | K003 | L003 |
| | Upper middle point of lower lip | Y=E4X+F4 | G001 | H001 | I003 | J003 | K003 | L003 |
| | Lower middle point of lower lip | Y=E5X+F5 | G001 | H001 | I003 | J003 | K003 | L003 |
| ... | | ... | | | | ... | | |

IMAGE PROCESSING DEVICE, INFORMATION GENERATION DEVICE, IMAGE PROCESSING METHOD, INFORMATION GENERATION METHOD, CONTROL PROGRAM, AND RECORDING MEDIUM FOR IDENTIFYING FACIAL FEATURES OF AN IMAGE BASED ON ANOTHER IMAGE

CROSS-REFERENCE TO RELATED APPLICATION(S)

This application claims the benefit of priority from Japanese Patent Application No. 2011-127755, filed 7 Jun. 2011, and International Application No. PCT/JP2012/056516, filed on 14 Mar. 2012 and designating the United States, the entire contents of which is incorporated herein by reference for all purpose.

TECHNICAL FIELD

The present invention relates to an image processing device for detecting a region point such as a contour point, a feature point, and the like of an object such as eyes, mouth, and the like, an information generation device, an image processing method, an information generation method and a computer-readable medium.

BACKGROUND

The technique of detecting the contour point of the eyes and mouth from a facial image has been actively researched in the prior art because it can be applied to pre-stage processing for face authentication and expression estimation, and to an application for generating a portrait and the like.

For example, Japanese Unexamined Patent Publication No. 9-6964 (published Jan. 10, 1997) (Patent Document 1) describes a technique of setting a search range of the eye, mouth, and the like with a center point of the eye, mouth, and the like specified by a user as a center, scanning the set search range, and extracting an eye region, mouth region, and the like based on a color component and the like. Patent Document 1 also describes identifying left and right end points of the extracted eye region, mouth region, and the like, setting a search range for searching upper and lower end points of the eye region, mouth region, and the like based on the left and right end points, and extracting the upper and lower end points.

Japanese Unexamined Patent Publication No. 2005-339288 (published Dec. 8, 2005) (Patent Document 2) describes fitting a dynamic contour model based on a reference point, the reference point being left and right end points of an eye, and extracting the contour point of the eye by energy minimization when extracting the contour point of the eye.

A method of detecting the contour point of the eye and the mouth from a facial image includes a fitting method based on a shape model and a texture model. Specifically, the fitting method of ASM (Active Shape Model), AAM (Active Appearance Model), ASAM (Active Structure Appearance Model), and the like described in T. F. Cootes, et al., "Active Shape Models—Their Training and Application", CVIU, Vol. 6, No. 1, pp. 38-59, 1995 (non-Patent Document 1), T. F. Cootes, et al., "Active appearance models", ECCV '98 Vol. II, Freiburg, Germany, 1998 (non-Patent Document 2) and Japanese Patent Publication No. 4093273 (issued Jun. 4, 2008) (Patent Document 3), Japanese Patent Publication No. 4501937 (issued Jul. 14, 2010) (Patent Document 4) is known.

The shape models of ASM, AAM, and ASAM are models that express the shape and texture of the face with a few parameters. These models are obtained in such a way that a main component analysis is applied on face feature point coordinate information and the texture information, and the feature point coordinates of the face are expressed with only a base vector having a large eigenvalue among the base vectors obtained as a result. Accordingly, not only can the shape of the face be expressed with few data, but restraining conditions for maintaining the shape of the face can be provided. This model is fitted to a facial image by energy minimization in the ASM and the AAM and by model parameter error calculation in the ASAM to detect the feature point coordinates of the face.

The expression of the face changes in various ways and has a wide range of variations according to the shape of the mouth, shape of the eye, combination thereof, and the like. Thus, it is difficult to predict all shape states of an object such as eye, mouth, and the like that change into various shapes. In the prior arts described above, therefore, it is difficult to detect, with high accuracy, the contour point of the object the shape of which greatly changes, such as the contour point of the eye and the mouth, and the like.

Specifically, in the technique described in Patent Document 1, the contour point cannot be correctly detected if the shape of the eye, mouth, or the like changes beyond assumption and the contour point of the eye, mouth, or the like is not within the search range. If the search range is set wide to cover the various shapes of the mouth and shapes of the eye, the processing load becomes very large since the contour point is detected by scanning the search range in the technique described in Patent Document 1. It is thus unpractical to set the search range wide in the technique described in Patent Document 1. Therefore, it is difficult to detect, with high accuracy, the contour point of the object the shape of which greatly changes, in the technique described in Patent Document 1.

Furthermore, in the technique described in Patent Document 2, it takes a very long time to extract the contract point of the object or the contour point cannot be correctly extracted if the shape of the object is significantly different from the dynamic contour model being used. If various models are prepared to cover the various shapes of the mouth and shapes of the eye, the accuracy in extracting the contour point is enhanced, but the size of data to be stored in the device and the processing load may be large. Thus, it is unpractical to prepare various models in the technique described in Patent Document 2. Therefore, it is difficult to detect, with high accuracy, the contour point of the object the shape of which greatly changes, in the technique described in Patent Document 2.

The ASM and the AAM have a defect in that a great amount of calculation time is required for the search processing. The AAM also has a problem in that the shape model for each individual needs to be prepared and the fitting accuracy with respect to the face of somebody else is low.

The ASAM realizes high speed and high accuracy with respect to the ASM and the AAM. The ASAM assumes the shape of the face as the restraining condition with respect to the face in which the expression change is small, so that highly accurate detection results can be obtained. The ASAM, however, cannot detect with high accuracy the expression in which the open/close state and the shape state of the mouth, eye, and the like greatly changes. This is because the shape model of the face used in the ASAM is a global model that expresses the shape of the entire face, and cannot make accurate expression on the changes for each region such as the eye and the mouth, for example, the open/close state and the shape state.

In light of the foregoing, it is an object of at least one embodiment of the present invention to realize an image processing device for detecting the shape of an object on an image with high accuracy, even with respect to the object that changes to various shapes, an information generation device, an image processing method, an information generation method, a control program, and a recording medium.

SUMMARY

Disclosed is an image processing device configured to detect a region point of an object from an image, the image processing device including a reference point identification section configured to identify a reference point with respect to the region point on the image; a feature value extraction section configured to extract a feature value from a pixel of a sampling point or a group of pixels including the pixel for every plurality of sampling points with respect to the reference point, and to extract a group of feature values with respect to the reference point configured by the extracted plurality of feature values corresponding to each of the sampling points; a location information identification section configured to reference correspondence information indicating a correspondence of the group of feature values with respect to the reference point extracted from each pixel or each group of pixels of the plurality of sampling points and location information indicating a relative location of the region point with respect to the reference point to identify location information corresponding to the group of feature values extracted by the feature value extraction section; and a detection side region point identification section configured to assume a location indicated by the location information identified by the location information identification section as the region point of the object.

BRIEF DESCRIPTION OF THE DRAWINGS

FIG. 7 is a chart showing one example of the LRF information including the LRF function stored in a storage unit of the LRF learning device.

DESCRIPTION

There is a correlative relationship between a group of feature values extracted from a region including an organ such as eye and mouth on an image, and a location of a contour point and a feature point of the organ having a reference point on the image as an origin. According to an embodiment, described is a model indicating a correspondence of the group of feature values and the location through regression analysis, and a detection method that uses such a model.

Through the use of such detection method, the face and each organ can be accurately detected under various conditions, not only for expressions assumed in advance but for expressions in which the eye, mouth, and the like open/close extremely. The detection method will be hereinafter referred to as Local Regression Fitting (LRF) detection method, and a learning method for creating the model will be referred to as LRF learning method.

The LRF detection method may be used in combination with the global fitting for capturing the comprehensive shape of the prior art for accurately detecting the face and each organ. Specifically, disclosed is a hierarchical fitting, a combination of the global fitting in which the comprehensive shape of the face is captured using the global model based on a learning method such as the ASAM and the local fitting (LRF detection method) in which each detailed shape of each organ is captured using a local model for every organ of the face based on the LRF learning method.

Figure 2:
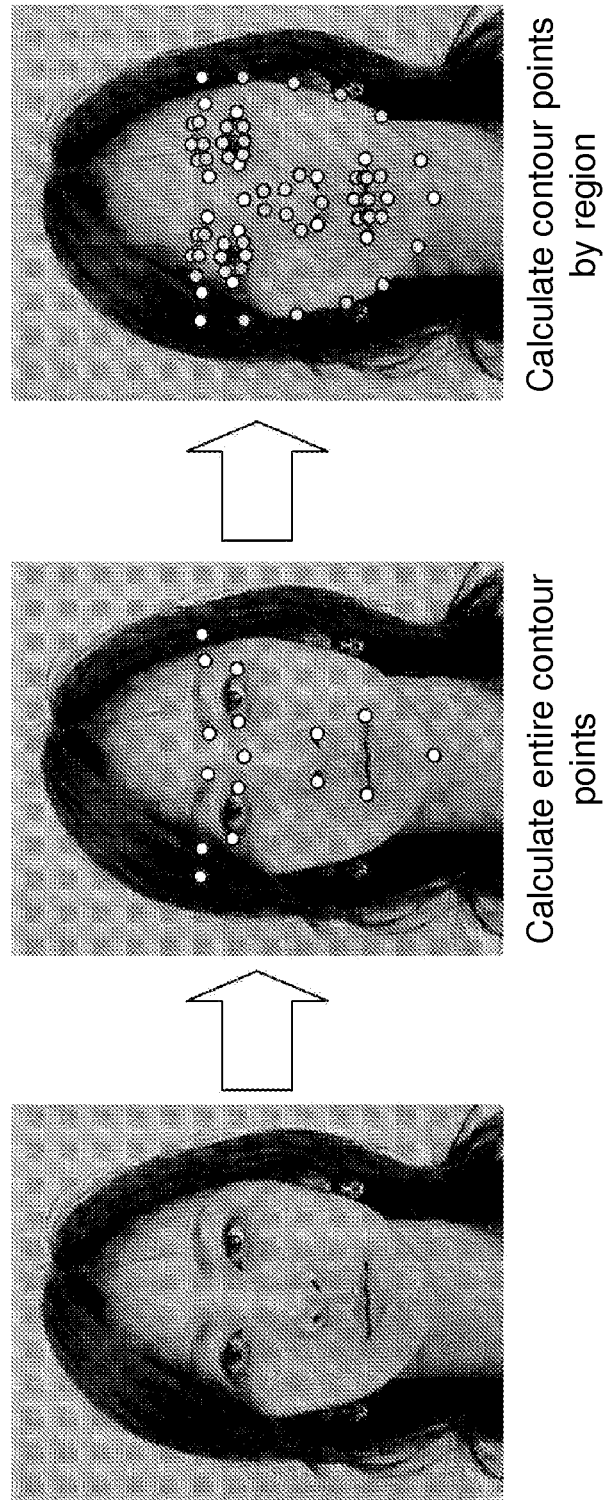
FIG. 2 is a schematic view showing an outline of a hierarchical fitting.

More specifically, in the hierarchical fitting, the temples (two areas), the heads and tails of left and right eyebrows, the inner corners and tails of both eyes, the nostrils (two areas), the corners of the mouth (two areas), the bottom of the chin, and the like are first detected by global fitting, as shown in FIG. 2. Other contour points of the face, eyebrows, eyes, nose, and mouth are then detected by the LRF detection method. The contours of the face and each organ are detected on the basis of the contour points detected by the global fitting and the LRF detection method.

Thus, the contour of the face can be detected with high accuracy even with respect to the expression that cannot be expressed with the global model. Furthermore, according to such hierarchical structure, serious erroneous detection can be reduced by global fitting, and the face contour feature point can be accurately detected by local fitting even in the facial image in which the expression changes.

Hereinafter, a region point detection device (image processing device) for detecting a region point of a contour point, a feature point, and the like of an object on an image through the LRF detection method, and an LRF learning device (information generation device) for generating a model through the LRF learning method according to one embodiment will be described based on FIG. 1 to FIG. 12. The description will be made below assuming the region point detection device and the LRF learning device are separate devices, but the region point detection device and the LRF learning device may be an integrated device.

[Configuration of LRF Learning Device]

First, the LRF learning device will be described based on FIG. 3. The LRF learning device is a device for generating an LRF function (correspondence information) which denotes a correspondence of a relative location of a region point of an object for a reference point on an image and a group of feature values extracted from a predetermined location on the image based on the region point, in the image acquired from another device or in the image imaged with a camera mounted on the own device.

The LRF learning device may be, for example, a PC, a digital camera, a portable telephone, a PDA (Personal Digital Assistant), a game machine, a device for photographing and printing, a device for editing images, and the like.

In the present embodiment, the object including the target region point to learn the correspondence is the eye, mouth, and the like of a human, but is not limited thereto. For example, the region point may be the face, organ, and the like of animals such as dogs and cats, may be a portable telephone, a television, and the like, or may be a building, cloud, and the like.

The region point of the object is a point within a region of the object on the image. Specifically, the region point is the contour point, eye point, and the like of the eye when the object is the eye. The region point of the object, which is the target the LRF learning device is to learn the correspondence, is referred to as a learning target point, and the object including the learning target point is referred to as a learning target object.

Figure 3:
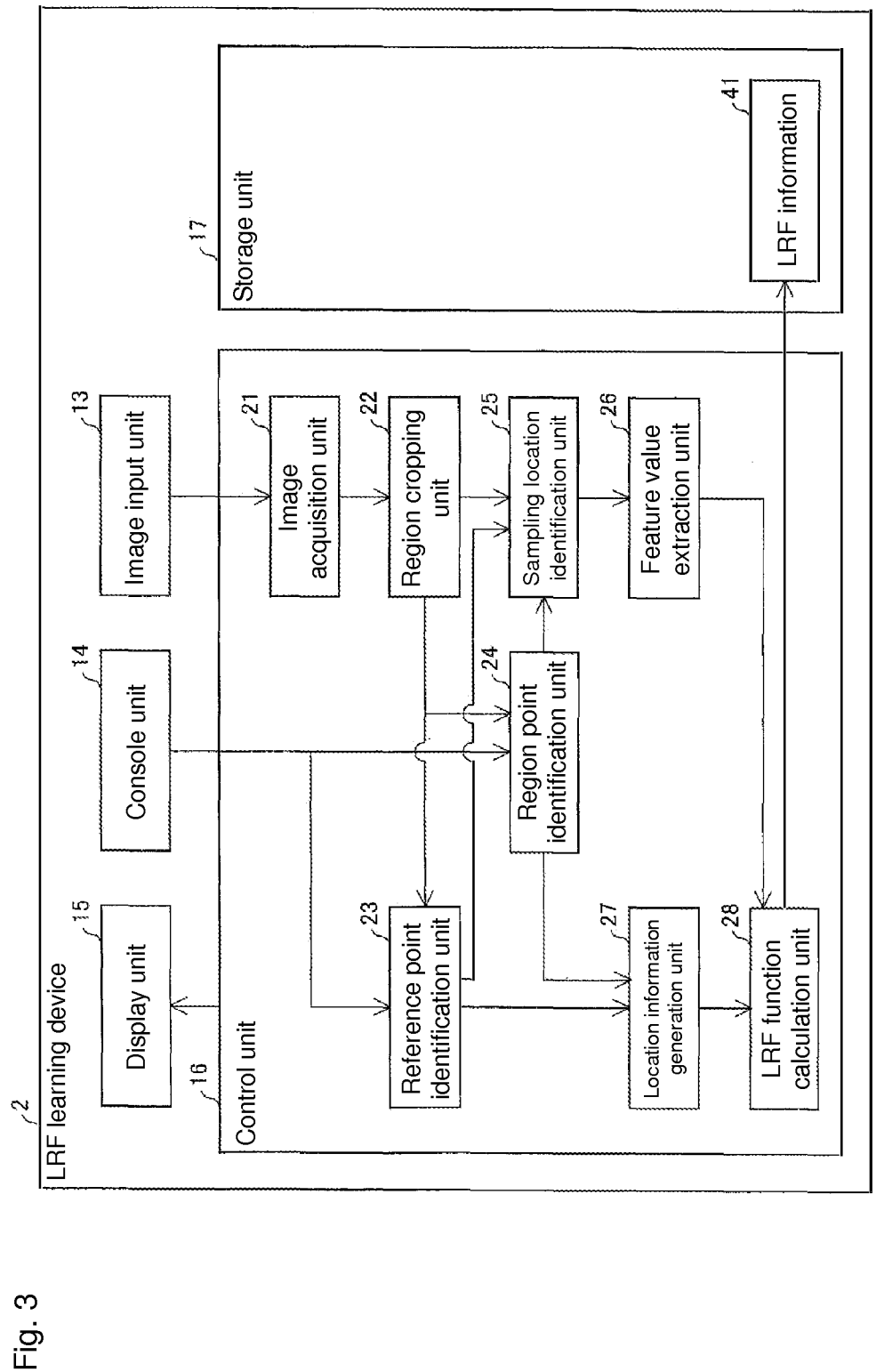
FIG. 3 is a block diagram showing a configuration of the main parts of an LRF learning device.

FIG. 3 is a block diagram showing one example of a configuration of the main parts of the LRF learning device 2. As shown in FIG. 3, the LRF learning device 2 includes a control unit 16, a storage unit 17, an image input unit 13, an console unit (input section) 14, and a display unit 15. The LRF learning device 2 may include members such as a communication unit for communicating with other devices, an audio input unit, an audio output unit, and the like, but such members are not illustrated as they are irrelevant to the characteristic aspect of the invention.

The image input unit 13 receives an image from an external image providing device (not shown). The image providing device may be a device that provides a holding image or an acquired image to another device. For example, the image providing device may be a digital camera, a PC, a portable telephone, a PDA, a game machine, a digital television, a storage device such as a USB (Universal Serial Bus) memory, and the like. The LRF learning device 2 may be mounted with a camera in place of the image input unit 13.

The console unit 14 is provided for the user to input an instruction signal to the LRF learning device 2 and operate the LRF learning device 2. The console unit 14 may be configured by an input device such as a keyboard, a mouse, a keypad, an operation button, and the like. For example, a touch panel in which the console unit 14 and the display unit 15 are integrated may be adopted. The console unit 14 may be a remote control device such as a remote controller, which is a separate body from the LRF learning device 2.

The display unit 15 displays the image in accordance with the instruction of the control unit 16. The display unit 15 may display the image in accordance with the instruction of the control unit 16, and an LCD (Liquid Crystal Display), an organic EL display, a plasma display, and the like, for example, may be applied.

The control unit 16 executes a program read out from the storage unit 17 to a temporary storage unit (not shown) to carry out various types of computations and to comprehensively control each unit of the LRF learning device 2.

In the present embodiment, the control unit 16 has a configuration including, as function blocks, an image acquisition unit (image acquisition section) 21, a region cropping unit 22, a reference point identification unit (reference point identification section) 23, a region point identification unit (learning side region point identification section 24), a sampling location identification unit (sampling location identification section) 25, a feature value extraction unit (feature value extraction section) 26, a location information generation unit (location information generation section) 27, and an LRF function calculation unit (correspondence information generation section) 28. Each function block (21 to 28) of the control unit 16 is realized by having a CPU (Central Processing Unit) read out the program stored in the storage device realized by a ROM (Read Only Memory) and the like to the temporary storage unit realized by a RAM (Random Access Memory) and the like, and execute the same.

The image acquisition unit 21 acquires the image input through the image input unit 13. The image acquisition unit 21 outputs the acquired image to the region cropping unit 22. If the image is stored in the storage unit 17, the image acquisition unit 21 may read out the image from the storage unit 17.

The region cropping unit 22 extracts a learning target region image, which is the image of the region including the learning target point, from the acquired image based on a predetermined learning target region image extraction method. The region cropping unit 22 also normalizes the extracted learning target region image based on a predetermined normalization method to generate a normalized image. The region cropping unit 22 outputs the generated normalized image to the reference point identification unit 23, the region point identification unit 24, and the sampling location identification unit 25.

Specifically, if the learning target object is "eye" or "mouth", for example, the region cropping unit 22 extracts the facial image from the acquired image, and corrects the extracted facial image to an image of 100 pixels×100 pixels, for example, to generate the normalized image.

The learning target region image extraction method and the normalization method merely need to be defined in advance for every region point (learning target point) of the object, and the specific method may be arbitrary. The image acquired by the image acquisition unit 21, which serves as the basis of the normalized image, will be hereinafter referred to as an original image.

The reference point identification unit 23 acquires the normalized image from the region cropping unit 22, and identifies a predetermined point on the acquired normalized image as a reference point based on a predetermined reference point identification method. The reference point identification unit 23 outputs reference coordinates, which are coordinates on the normalized image of the identified reference point, to the location information generation unit 27.

Figure 4:
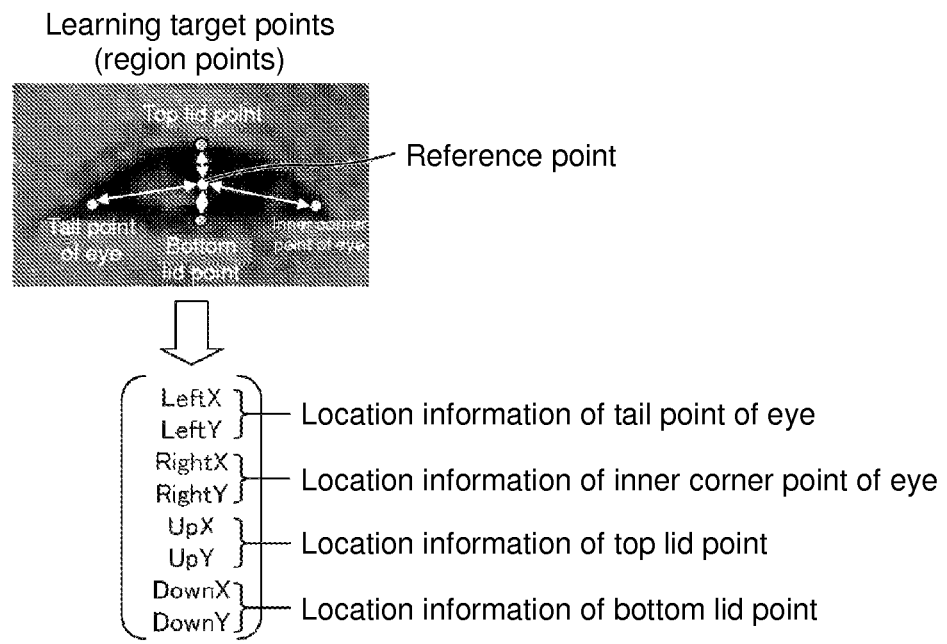
FIG. 4 is a schematic view showing an outline of a reference point identification method and a location information generation method.

Specifically, as shown in FIG. 4, when the learning target object is the "eye", for example, the reference point identification unit 23 identifies a center point of the eye on the normalized image as a reference point. At this time, the reference point identification unit 23 may display the normalized image on the display unit 15 to instruct the user to specify the center point of the eye, and identify the point specified by the user as a reference point. The reference point identification unit 23 may identify the center point between the inner corner point and the tail point of the eye as reference point based on the inner corner point and the tail point of the eye identified when the region cropping unit 22 extracts the facial image. The reference point identification unit 23 may also reference metadata (reference point location information) associated with the original image, and identify the reference point by affine transformation and the like, based on the location of the center point of the eye indicated by the metadata. In this case, the location of the center point of the eye on the original image is identified with respect to each original image and the metadata including the information indicating the identified location of the center point of the eye is associated with the original image in advance before the LRF learning device 2 executes learning. The metadata may include information (e.g., inner corner point and tail point of the eye, etc.) for identifying the location of the center point of the eye, instead of the information indicating the location of the center point of the eye.

The reference point may be any point as long as it is a point on the normalized image. In other words, when the learning target object is the "eye", for example, the inner corner point or the tail point of the eye may be assumed as the reference point, the center point of the face (center point of the normalized image) may be assumed as the reference point, or the upper left end point and the like of the normalized image may be assumed as the reference point.

The reference point identification method may be defined in advance for every region point (learning target point) of the object, and the specific method may be arbitrary.

The region point identification unit 24 acquires the normalized image from the region cropping unit 22, and identifies the learning target point on the acquired normalized image based on the instruction of the user input with the console unit 14. The region point identification unit 24 outputs region coordinates, which are coordinates on the normalized image of the identified learning target point, to the location information generation unit 27.

Specifically, when the learning target point is "top lid point", which is the contour point of the eye, for example, the region point identification unit 24 displays the normalized image on the display unit 15 to instruct the user to specify the top lid point of the eye, and identifies the point specified by the user as the learning target point. The region point identification unit 24 may also reference metadata (region point location information) associated with the original image, and identify the learning target point by affine transformation and the like, based on the location of the top lid point of the eye indicated by the metadata. In this case, the location of the top lid point of the eye on the original image is identified with respect to each original image and the metadata including the information indicating the identified location of the top lid point of the eye is associated with the original image in advance before the LRF learning device 2 executes learning.

In the example shown in FIG. 4, the bottom lid point, the inner corner point and the tail point of the eye are identified, in addition to the top lid point, as the learning target points. The top lid point is a vertex of an arc on the upper side formed by the contour point of the eye. The bottom lid point is a vertex of an arc on the lower side formed by the contour point of the eye.

The sampling location identification unit 25 acquires the normalized image from the region cropping unit 22, and identifies a plurality of sampling points for the reference point (region point) within a predetermined range on the normalized image based on a predetermined sampling location identification method. The predetermined range is referred to as a sampling range.

The sampling location identification method may be defined in advance for every region point (learning target point) of the object, and may be any method.

Specifically, the sampling point identified by the sampling location identification unit 25 may be any point within the sampling range. For example, the sampling location identification unit 25 may assume all pixels within the sampling range as sampling points. The sampling location identification unit 25 may regularly or irregularly select the pixel in the sampling range, and assume the selected pixel as the sampling point. The sampling location identification unit 25 may divide the sampling range into a plurality of blocks, and assume the center point of the block as the sampling point.

The sampling range may be any range as long as it is a range including a region where the learning target point is assumed to be located on the normalized image. For example, a range of n pixels×m pixels including the region where the learning target point is assumed to be located may be the sampling range. The region where the learning target point is assumed to be located may be a region of predetermined location and size on the normalized image. For example, when the top lid point is the learning target point, the center point of the eye may be identified from the inner corner point and the tail point of the eye, and a predetermined range on the upper side from the center point of the eye may be set as the region where the learning target point is assumed to be located.

Figure 5:
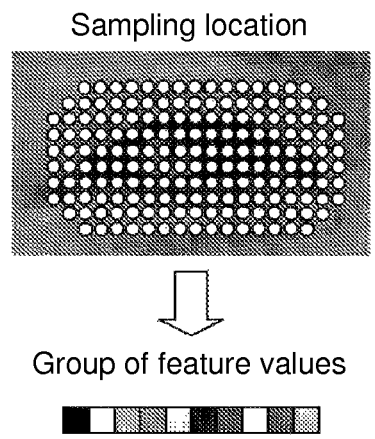
FIG. 5 is a schematic view showing an outline of a sampling location identification method and a feature value extraction method.

A range including the range where the learning target object is assumed to be located may be the sampling range. Specifically, as shown in FIG. 5, when the learning target object is the eye, a range covering the region where the eye is assumed to be located may be the sampling range on the normalized image, and for example, the center point of the eye may be identified from the inner corner point and the tail point of the eye as described above, and the range of i pixels×j pixels having the center point of the eye as the center may be assumed as the sampling range.

The shape of the sampling range is not limited to a rectangle as in i pixels×j pixels. The shape of the sampling range may be arbitrary, and may be other polygonal shapes, or a circle. In the example shown in FIG. 5, the range covering the region where the eye is assumed to be located is set as the sampling range, and hence the shape of the sampling range is a shape in which the four corners are removed from the rectangle.

The feature value extraction unit 26 extracts the feature value from the pixel of the sampling point or a group of pixels including the pixel of the sampling point for every sampling point identified by the sampling location identification unit 25 based on a predetermined feature value extraction method. The feature value extraction unit 26 generates a group of feature values configured by a plurality of feature values corresponding to each of the sampling points, for every region point.

In other words, the feature value extraction unit 26 extracts the feature value from the pixel of the sampling point or the group of pixels including the relevant pixel for every plurality of sampling points with respect to the reference point corresponding to the region point, and extracts the group of feature values with respect to the reference point, configured by the extracted plurality of feature values corresponding to each of the sampling points.

The feature value extraction method may be defined in advance for every region point (learning target point) of the object, and may be any method.

Specifically, the feature value extracted by the feature value extraction unit 26 may be arbitrary. For example, the feature value may be luminance value, edge information, frequency characteristics (Gabor, Haar, etc.), luminance gradient feature value (SIFT, HOG, etc.), or a combination thereof.

When extracting the feature value from the group of pixels including the pixel of the sampling point, the feature value extraction unit 26 may extract the feature value based on the average value or the median value of the values of all the pixels included in the group of pixels. In this case, the feature value extraction unit 26 may extract the feature value based on one or a plurality of pixels included in the group of pixels. For example, when extracting the feature value from the group of pixels including 9 pixels of 3×3 pixels having the sampling point as the center, the feature value extraction unit 26 may extract the feature value based on the average value or the median value of the values of the 9 pixels. The feature value extraction unit 26 may extract the feature value based on one or a plurality of pixels of the 9 pixels.

The feature value extraction unit 26 may extract a plurality of types of feature values from one sampling point. For example, the feature value extraction unit 26 may extract the luminance value and the Haar-like feature value, respectively, as feature values from the pixel or the group of pixels of one sampling point. The feature value extraction unit 26 may extract the luminance value as the feature value from the group of pixels of 3×3 pixels having the sampling point as the center and extract the luminance value as the feature value from the group of pixels of 4×4 pixels having the same sampling point as the center to extract two types of feature values.

In the example shown in FIG. 5, the feature value extraction unit 26 extracts the Haar-like feature value from each pixel of the sampling point as the feature value, and generates a group of feature values. The sampling location identification unit 25, for example, sets a few hundred sampling points within the sampling range. In other words, the feature value extraction unit 26 generates the group of feature values including the few hundred feature values, for example.

The location information generation unit 27 acquires the reference coordinates from the reference point identification unit 23, and acquires the region coordinates from the region point identification unit 24. The location information generation unit 27 generates the location information indicating the location of the learning target point having the reference point as the origin based on a predetermined location information generation method. In other words, the location information generation unit 27 generates the location information indicating the relative location of the learning target point with respect to the reference point based on the predetermined location information generation method. The location information generation unit 27 outputs the generated location information to the LRF function calculation unit 28.

The location information is the coordinates in an x-y coordinate system or a polar coordinate system. The reference coordinates and the region coordinates may be either in the x-y coordinate system or the polar coordinate system.

The location information generation method may be defined in advance for every region point (learning target point) of the object, and may be any method.

In the example shown in FIG. 4, the location information generation unit 27 expresses the reference coordinates and the region coordinates, as well as the location information in the x-y coordinate system, calculates the difference of the region coordinates and the reference coordinates for each region coordinates, and generates the location information of each learning target point. In other words, the location information (X, Y) is calculated with (a-c, b-d), assuming the region coordinates are (a, b) and the reference coordinates are (c, d).

In FIG. 4, "LeftX" and "LeftY" respectively indicate the x coordinate and the y coordinate of the location information of the tail point of the eye, "RightX" and "RightY" respectively indicate the x coordinate and the y coordinate of the location information of the inner corner of the eye, "UpX" and "UpY" respectively indicate the x coordinate and the y coordinate of the location information of the top lid point, and "DownX" and "DownY" respectively indicate the x coordinate and the y coordinate of the location information of the bottom lid point.

The LRF function calculation unit 28 acquires the group of feature values with respect to the learning target point from the feature value extraction unit 26 and acquires the location information with respect to the learning target point from the location information generation unit 27 for every learning target point with respect to one image. The LRF function calculation unit 28 generates the correspondence information indicating the correspondence of the location information and the group of feature values with respect to the learning target point based on the group of feature values and the location information generated from a plurality of images for every learning target point. When generating the correspondence information, the LRF function calculation unit 28 uses the location information and the group of feature values generated by the same method (learning target region image extraction method, normalization method, reference point identification method, sampling location identification method, feature value extraction method, and location information generation method are the same) with respect to the same learning target point.

Figure 6:
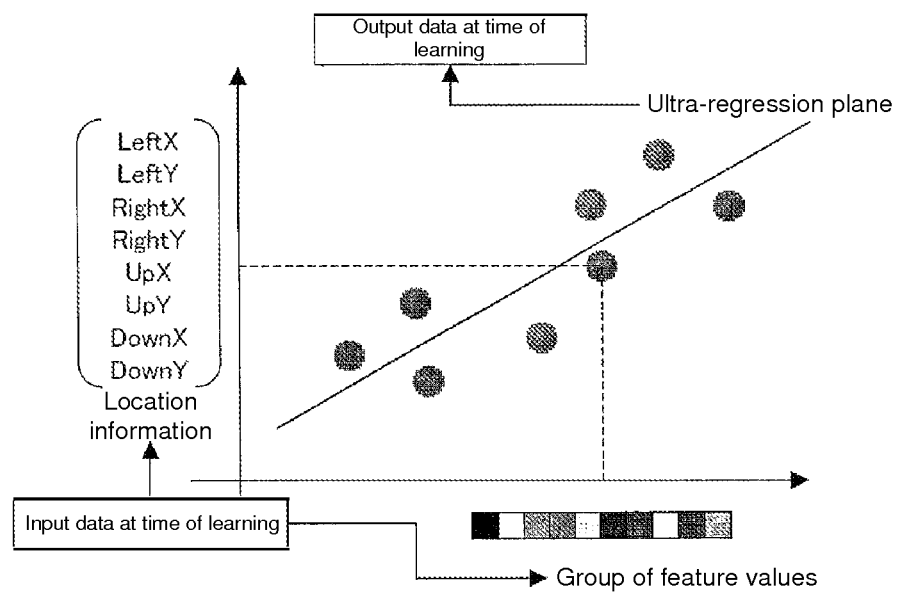
FIG. 6 is a schematic view showing an outline of an LRF function showing a correlative relationship of the location information and the group of feature values.

Specifically, as shown in FIG. 6, the LRF function calculation unit 28 plots the group of feature values and the location information generated from the plurality of images, and calculates the LRF function (correspondence information) indicating the correlative relationship of the location information and the group of feature values using the regression analysis. In FIG. 6, the correspondence is shown in a plane for the sake of convenience of explanation, but actually, the correspondence of the group of feature values and the location information is high dimensional, therefore the LRF function should be expressed in an ultra-regression plane.

Furthermore, in the example shown in FIG. 6, the sampling range is set to include all regions where each learning target point (tail point, inner corner point, top lid point, and bottom lid point) is assumed to be located, the same group of feature values is generated with respect to each learning target point, and the location information of each learning target point is generated using the same reference point, and hence one group of feature values is associated with the location information of each learning target point. This is not the sole case, however, and the location information and the group of feature values may be generated individually for each learning target point, and the LRF function may be obtained for every learning target point.

In the example shown in FIG. 6, $Y=AX+B$ is given, where X is the group of feature values and Y is the location information. For example, if the group X of feature values is configured by m (m=k×(number of types of feature value extracted from one sampling point)) feature values extracted from k sampling points, and the location information Y is configured by the x coordinate and the y coordinate of n learning target points, the group X of feature values=$(x_1, x_2, \ldots, x_m)^T$ and the location information Y=$(y_1, y_2, \ldots, y_{2n})^T$ are obtained. In this case, the coefficient A is expressed with a matrix of 2n×m and the coefficient B is expressed with a matrix of 2n×1.

The regression analysis used by the LRF function calculation unit 28 may be regression analysis such as multiple regression, CCA, and the like. The LRF function obtained by the LRF function calculation unit 28 may be linear as shown in FIG. 6, or may be non-linear.

The LRF function calculation unit 28 may generate a correspondence table that identifies the correspondence of the location information and the group of feature values based on the correspondence of the location information and the group of feature values.

The LRF function calculation unit 28 stores the LRF information in the storage unit 17. The LRF information consists of information in which the correspondence of the region point of the location indicated by the LRF function, and each method described above are associated with the generated LRF function.

The storage unit 17 stores the program, data, and the like to be referenced by the control unit 16, and stores the LRF information 41 and the like, for example.

The LRF information 41 stored in the storage unit 17 will be described based on FIG. 7. FIG. 7 is a view showing an example of the LRF information 41 stored in the storage unit 17.

As shown in FIG. 7, the LRF information 41 is information in which the region point and the LRF function relating to the region point are associated with each other. Furthermore, the LRF information 41 is information in which the region point and each method (learning target region image extraction method, normalization method, reference point identification method, sampling location identification method, feature value extraction method, and location information generation method) for generating the group of feature values and the location information are associated with each other.

In the example shown in FIG. 7, the same method is associated with each learning target point with respect to the learning target region image extraction method and the normalization method, and the same method is associated with each learning target point for every object with respect to the other methods, but this is not the sole case. Different methods may be associated for every learning target point.

In the example shown in FIG. 7, the LRF function is associated for every region point, but this is not the sole case, and the LRF function may be corresponded for every object. For example, in the example shown in FIG. 7, the learning target region image extraction method, the normalization method, the reference point identification method, the sampling location identification method, and the feature value extraction method are the same for every object. That is, the group X of feature values extracted from a certain image is the same regardless of the region point for the same object. In this case, if the location information is Y=$(y_1, y_2, \ldots, y_{10})^T$ for the right eye, for example, the LRF function of the right eye can be expressed as Y=AX+B assuming $y_1$ to $y_{10}$ to be the x coordinate and the y coordinate of the location information of the top lid point, the x coordinate and the y coordinate of the location information of the bottom lid point, the x coordinate and the y coordinate of the location information of the inner corner point of the eye, the x coordinate and the y coordinate of the location information of the tail point of the eye, and the x coordinate and the y coordinate of the location information of the eye point, respectively. Note that, A=$(A_1, A_2, \ldots, A_5)^T$, and B=$(B_1, B_2, \ldots, B_5)^T$ apply.

In the example shown in FIG. 7, each method is associated with the LRF function in the LRF information 41, but this is not the sole case. In the example shown in FIG. 7, a case in which the LRF learning device appropriately selects each method and generates the LRF function at the time of learning is shown, but if a method defined in advance is used for each method for every region point at the time of learning and at the time of detection, the region point detection device 1 and the LRF learning device 2 may store the method defined in advance for every region point (e.g., the method may be incorporated in a learning program and a detection program). In this case, each method does not need to be associated with the LRF function in the LRF information 41, and the LRF information 41 may include the information indicating the LRF function associated with the region point.

[Configuration of Region Point Detection Device]

The region point detection device will now be described based on FIG. 1. The region point detection device is a device for detecting a region point such as a contour point, characteristic point, and the like of the object from the image acquired from another device or the image imaged with the camera mounted on the own device based on the LRF information generated by the LRF learning device.

The region point detection device may be, for example, a digital camera, a PC, a portable telephone, a PDA (Personal Digital Assistant), a game machine, a device for photographing and printing, a device for editing images, and the like.

In the present embodiment, the object including the region point to be detected is the eye, mouth, and the like of a human, but is not limited thereto. For example, the region point may be the face, organ, and the like of animals such as dogs and cats, may be a portable telephone, a television, and the like, or may be a building, cloud, and the like. The region point to be detected by the region point detection device is referred to as a detection target point, and the object including the detection target point is referred to as a detection target object.

Figure 1:
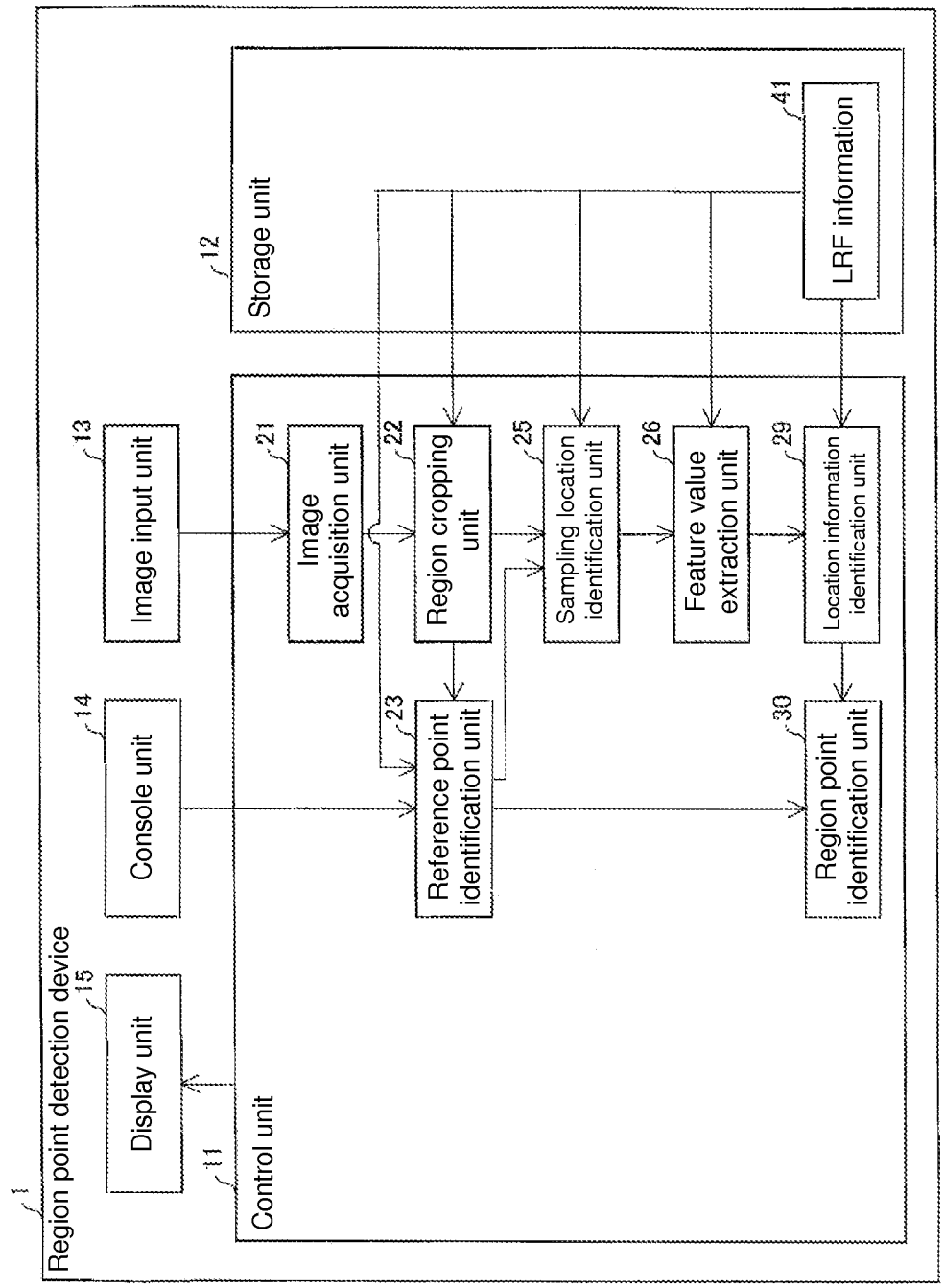
FIG. 1 shows an embodiment, and is a block diagram showing a configuration of the main parts of a region point detection device.

FIG. 1 is a block diagram showing one example of a configuration of the main parts of the region point detection device 1. As shown in FIG. 1, the region point detection device 1 includes a control unit 11, a storage unit 12, the image input unit 13, the console unit (input section) 14, and the display unit 15. The region point detection device 1 may include members such as a communication unit for communicating with other devices, an audio input unit, an audio output unit, and the like, but such members are not illustrated as they are irrelevant to the characteristic aspect of the invention.

For the sake of convenience of the explanation, the members having the same function as the members of the LRF learning device 2 are denoted with the same reference numerals, and the description thereof will be partially omitted.

The storage unit 12 stores the program, data, and the like to be referenced by the control unit 11, and for example, stores the LRF information 41 generated by the LRF learning device, and the like. The LRF information 41 stored in the storage unit 12 may be data shown in FIG. 7, for example.

The control unit 11 executes a program read out from the storage unit 12 to a temporary storage unit (not shown) to carry out various types of computations and to comprehensively control each unit of the region point detection device 1.

In the present embodiment, the control unit 11 has a configuration including, as function blocks, the image acquisition unit 21, the region cropping unit 22, the reference point identification unit 23, the sampling location identification unit (sampling location identification section) 25, the feature value extraction unit 26, a location information identification unit (location information identification section) 29, and a region point identification unit (detection side region point identification section) 30. Each function block (21 to 23, 25, 26, 29, 30) of the control unit 11 is realized by having a CPU read out the program stored in the storage device realized by a ROM and the like to the temporary storage unit realized by a RAM and the like, and execute the same.

The image acquisition unit 21 acquires the image input through the image input unit 13. The image acquisition unit 21 outputs the acquired image to the region cropping unit 22.

The region cropping unit 22 reads out the LRF information 41 from the storage unit 12, and extracts a detection target region image, which is the image of the region including the detection target point, from the acquired image based on the learning target region image extraction method corresponding to the detection target point in the LRF information 41.

The region cropping unit 22 also normalizes the extracted detection target region image based on the normalization method corresponding to the detection target point in the LRF information 41 to generate a normalized image. The region cropping unit 22 outputs the generated normalized image to the reference point identification unit 23 and the sampling location identification unit 25.

The reference point identification unit 23 reads out the LRF information 41 from the storage unit 12, and acquires the normalized image from the region cropping unit 22. The reference point identification unit 23 identifies a predetermined point on the acquired normalized image as a reference point based on the reference point identification method corresponding to the detection target point in the LRF information 41. The reference point identification unit 23 outputs reference coordinates, which coordinates on the normalized image of the identified reference point, to the region point identification unit 30.

The sampling location identification unit 25 reads out the LRF information 41 from the storage unit 12, acquires the normalized image from the region cropping unit 22, and identifies a plurality of sampling points for the reference point (region point) within a predetermined range on the normalized image based on the sampling location identification method associated with the detection target point in the LRF information 41.

The feature value extraction unit 26 reads out the LRF information 41 from the storage unit 12, and extracts the feature value from the pixel of the sampling point or a group of pixels including the pixel of the sampling point for every sampling point for the reference point based on the feature value extraction method associated with the detection target point in the LRF information 41. The feature value extraction unit 26 generates a group of feature values configured by a plurality of feature values corresponding to each of the sampling points.

The location information identification unit 29 reads out the LRF information 41 from the storage unit 12, and identifies the location information corresponding to the group of feature values generated by the feature value extraction unit 26 based on the LRF function associated with the detection target point in the LRF information 41. The location information identification unit 29 outputs the identified location information to the region point identification unit 30.

Figure 8:
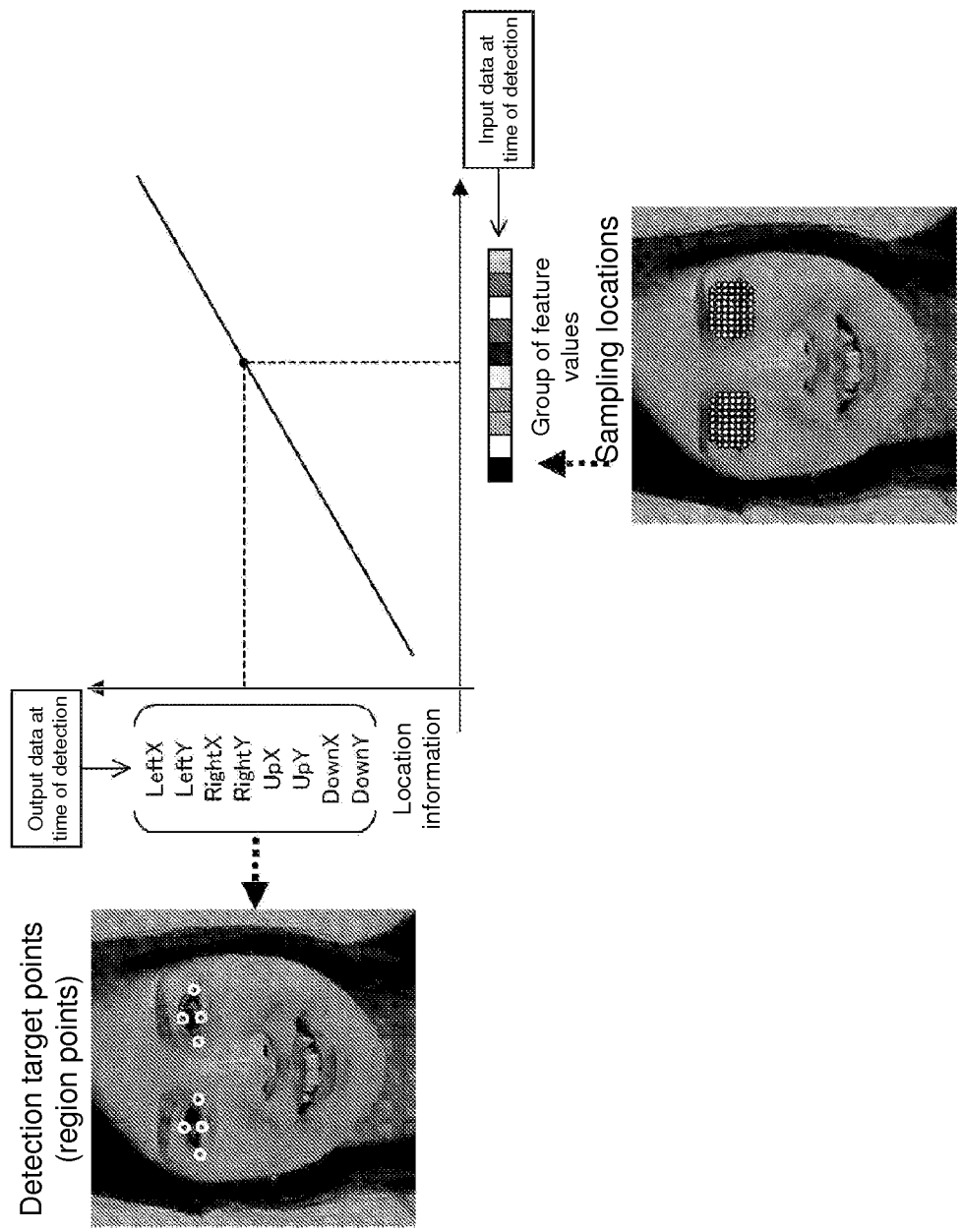
FIG. 8 is a view showing a correspondence of the group of feature values, which is input data, and the location information, which is output data, with respect to the LRF function.

Specifically, as shown in FIG. 8, the location information identification unit 29 provides the group of feature values generated by the feature value extraction unit 26 to the LRF function as input values, and obtains the output result as the location information.

The region point identification unit 30 acquires the reference coordinates from the reference point identification unit 23, and acquires the location information from the location information identification unit 29. The region point identification unit 30 identifies the location indicated by the location information having the point indicated by the reference coordinates as the origin as the detection target point in the normalized image.

[LRF Learning Method]

Figure 9:
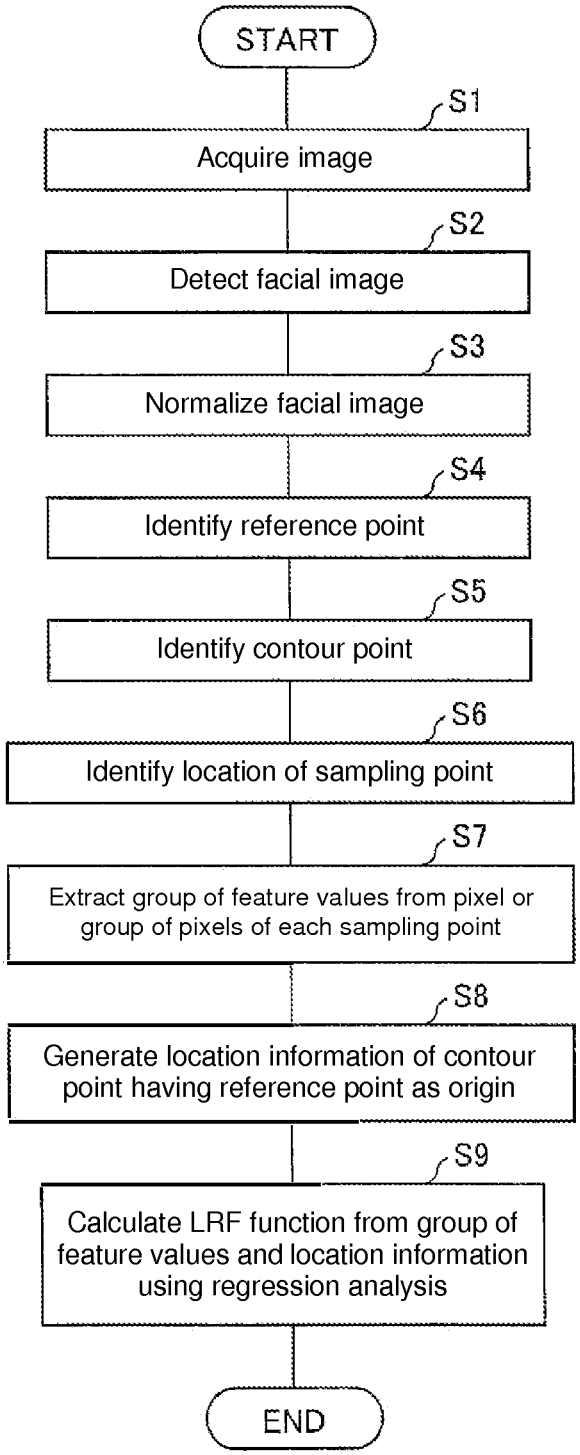
FIG. 9 is a chart showing one example of the LRF learning method executed by the LRF learning device.
Figure 10:
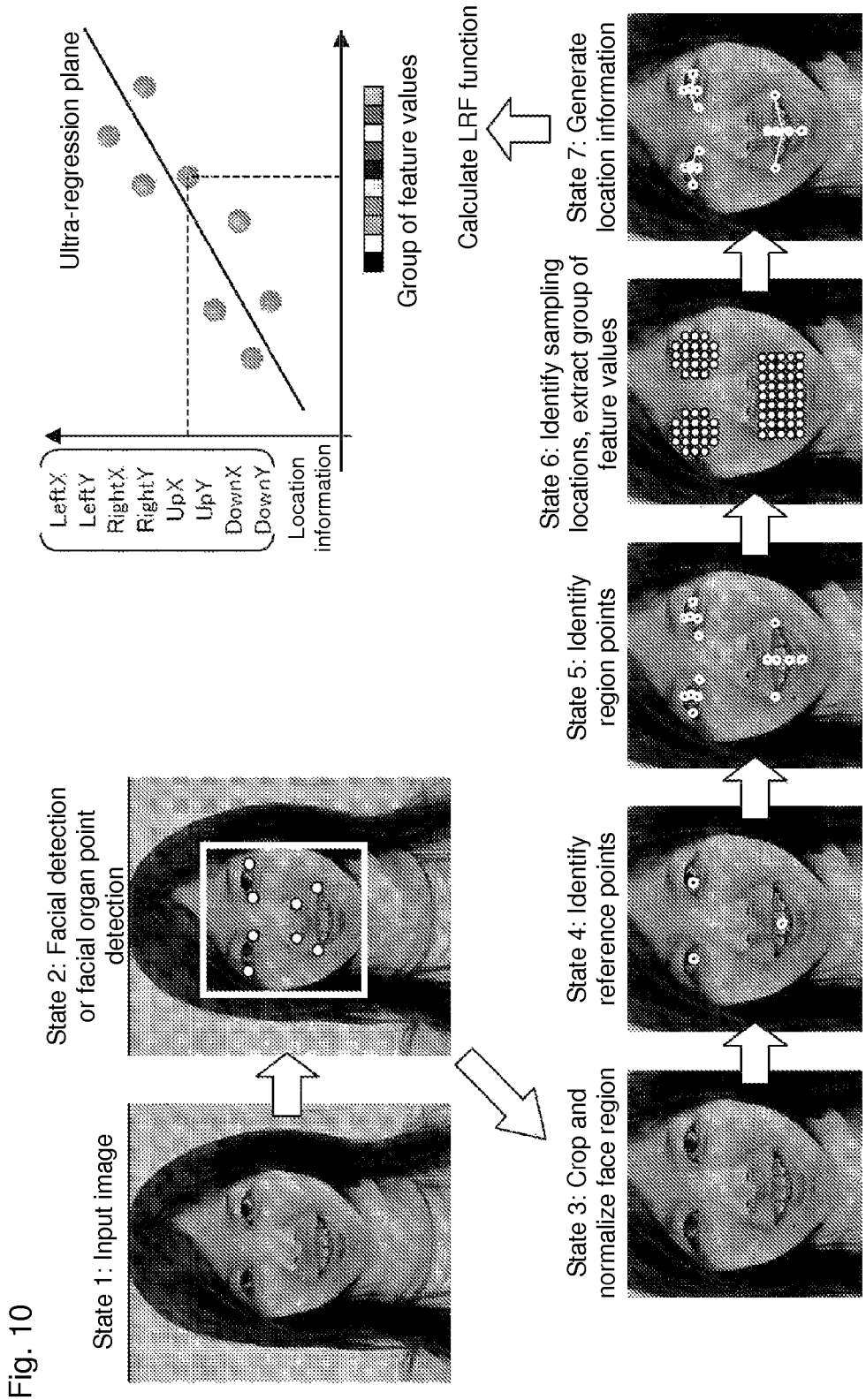
FIG. 10 is a transition diagram schematically showing a state of each processing in the LRF learning method using images.

The LRF learning method executed by the LRF learning device 2 will now be described based on FIG. 9 and FIG. 10. FIG. 9 is a view showing one example of a LRF learning method executed by the LRF learning device 2. FIG. 10 is a transition diagram schematically showing a state of each processing in the LRF learning method using images.

In the example shown in FIG. 9 and FIG. 10, the LRF function with respect to the contour points of both eyes and mouth of the face of the human is generated. Specifically, the tail points, inner corner points, top lid points, bottom lid points, and eye points of the right eye and the left eye, the right corner point and left corner point of the mouth, as well as the upper middle points and lower middle points of the upper lip and the lower lip are assumed as the learning target points. The upper middle point of the upper lip (lower lip) is the contour point on the upper side of the middle of the upper lip (lower lip), and the lower middle point of the upper lip (lower lip) is the contour point on the lower side of the middle of the upper lip (lower lip).

In the example shown in FIG. 9 and FIG. 10, the central points of the right eye, the left eye, and the mouth are assumed as the respective reference points. The sampling range is set to a range that covers each of the right eye, the left eye, and the mouth. Specifically, a predetermined range having the central point (reference point) of each of the right eye, the left eye, and the mouth as the center is set as the sampling range.

As shown in FIG. 9, the image acquisition unit 21 first acquires the image input through the image input unit 13 (S1). This state is shown in state 1 of FIG. 10.

The region cropping unit 22 then detects the facial image from the image acquired by the image acquisition unit 21 based on the learning target region image extraction method "G001" (e.g., conventional face detection method or facial organ point detection method) (S2). This state is shown in state 2 of FIG. 10. In state 2, the detected facial image is surrounded with a square line, and the detected facial organ points are indicated by white dots.

The region cropping unit 22 crops the detected facial image and normalizes the cropped facial image based on the normalization method "H001" to generate the normalized image (S3). This state is shown in state 3 of FIG. 10.

The reference point identification unit 23 then identifies the reference points of the right eye, the left eye, and the mouth on the normalized image based on the reference point identification methods "I001", "I002", "I003", respectively (S4). This state is shown in state 4 of FIG. 10. As described above, the respective reference points are set at the centers of the left and right eyes and the center of the mouth in state 4.

The region point identification unit 24 then identifies the tail points, inner corner points, top lid points, bottom lid points, and eye points of the right eye and the left eye, the right corner point and left corner point of the mouth, as well as the upper middle points and lower middle points of the upper lip and the lower lip as the learning target points on the normalized image (S5). This state is shown in state 5 of FIG. 10.

The sampling location identification unit 25 then identifies a plurality of sampling points in each sampling range on the normalized image based on the sampling location identification methods "J001", "J002", "J003", respectively (S6). The feature value extraction unit 26 extracts the group of feature values from the pixel or the group of pixels of each sampling point of the left and right eyes and the mouth based on the feature value extraction methods "K001", "K002", and "K003", respectively (S7). This state is shown in state 6 of FIG. 10. As described above, the sampling points are set at a predetermined location having the center point of each organ as the center so as to cover the left and right eyes and the mouth in state 6. In other words, three groups of features values are generated, the group of feature values for the tail point, inner corner point, top lid point, bottom lid point, and eye point of the right eye, the group of feature values for the tail point, inner corner point, top lid point, bottom lid point, and eye point of the left eye, and the group of feature values for the right corner point and left corner point of the mouth, as well as the upper middle points and lower middle points of the upper lip and the lower lip. In other words, three groups of feature values are respectively generated for each reference point (center point) of the right eye, the left eye, and the mouth.

The location information generation unit 27 then generates the location information indicating the location of the learning target point having the reference point as the origin for every learning target point based on the location information generation methods "L001", "L002", "L003" (S8). This state is shown in state 7 of FIG. 10.

The processing described above is performed on a plurality of images to generate the group of feature values and the location information with respect to each learning target point for every image.

The LRF function calculation unit 28 generates the LRF function with respect to each learning target point from the plurality of sets of location information and groups of feature values using regression analysis (S9). The LRF function calculation unit 28 then generates the LRF information 41 by associating each used method (learning target region image extraction method, normalization method, reference point identification method, sampling location identification method, feature value extraction method, and location information generation method) with the LRF function with respect to each generated learning target point, and stores the same in the storage unit 12.

[Region Point Detection Method]

Figure 11:
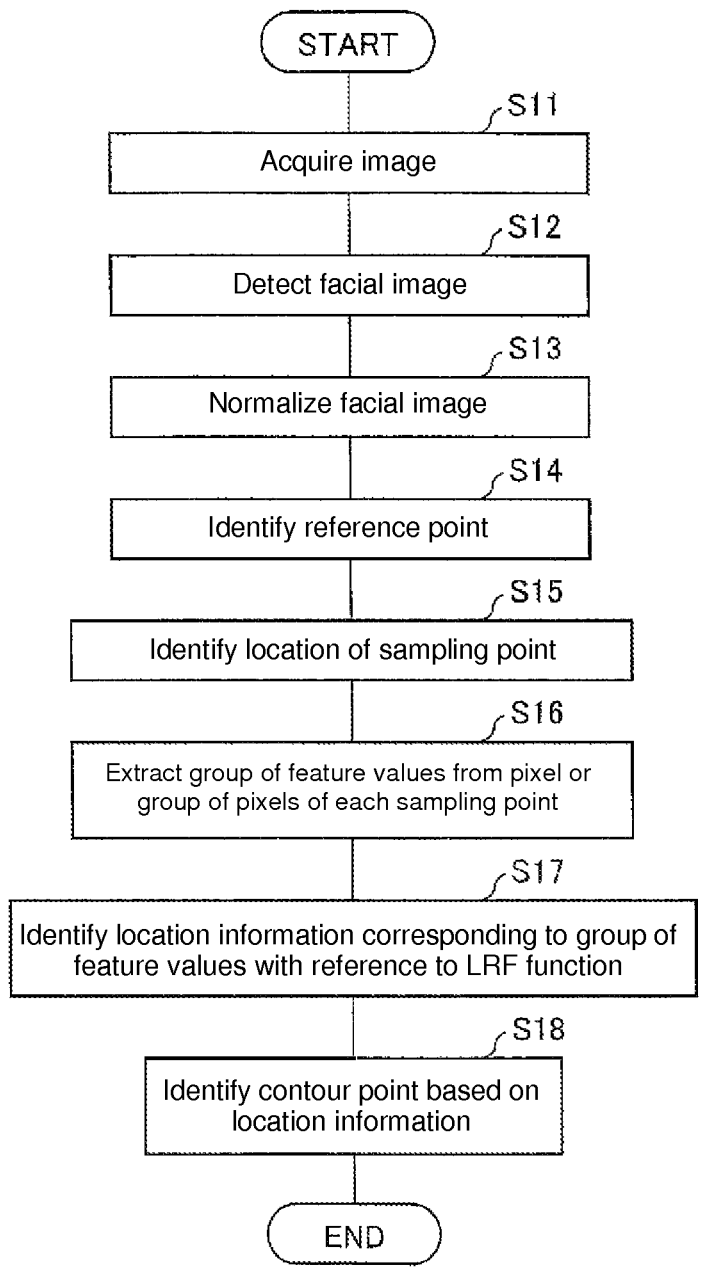
FIG. 11 is a chart showing one example of the region point detection method executed by the region point detection device.
Figure 12:
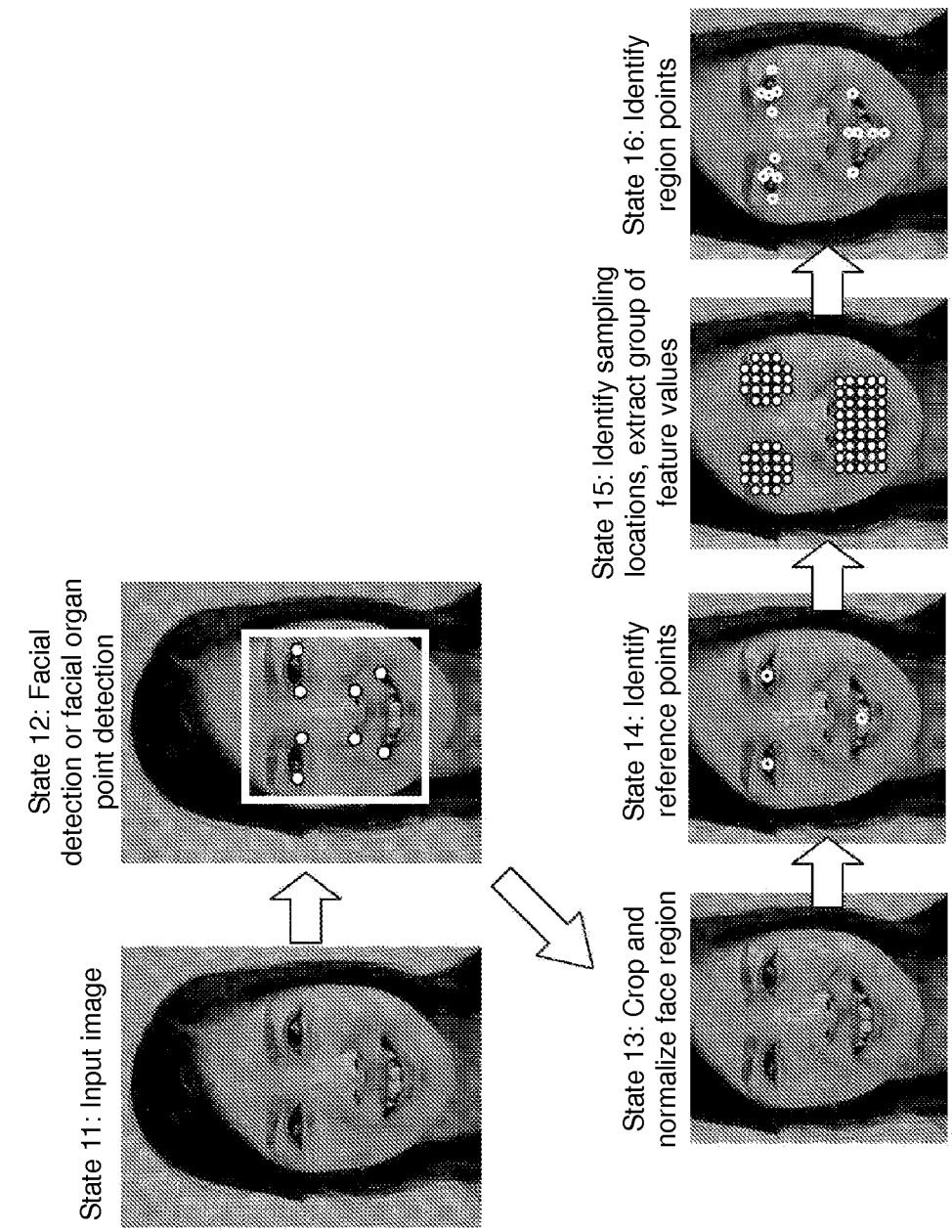
FIG. 12 is a transition diagram schematically showing a state of each processing in the region point detection method using images.

The region point detection method executed by the region point detection device 1 will now be described based on FIG. 11 and FIG. 12. FIG. 11 is a view showing one example of the region point detection method executed by the region point detection device 1. FIG. 12 is a transition diagram schematically showing states of each processing in the region point detection method using images.

In the example shown in FIG. 11 and FIG. 12, the LRF information 41 shown in FIG. 7 is assumed to be stored in the storage unit 12 of the region point detection device 1. The tail points, the inner corner points, the top lid points, the bottom lid points, and the eye points of the right eye and the left eye, the right corner point and the left corner point of the mouth, as well as the upper middle points and the lower middle points of the upper lip and the lower lip are assumed to be detected herein.

As shown in FIG. 11, the image acquisition unit 21 first acquires the image input through the image input unit 13 (S11). This state is shown in state 11 of FIG. 12.

The region cropping unit 22 then reads out the LRF information 41 from the storage unit 12. In the LRF information 41, the same learning target region image extraction method "G001" and the normalization method "H001" are associated with all the detection target points. Thus, the region cropping unit 22 crops the image from the image acquired by the image acquisition unit 21 based on the learning target region image extraction method "G001" (S12). This state is shown in state 12 of FIG. 12. In state 12, the facial image and the facial organ point are detected, the detected facial image being surrounded with a square line, and the detected facial organ points being indicated by white dots.

The region cropping unit 22 crops the detected facial image, and normalizes the cropped facial image based on the normalization method "H001" to generate the normalized image (S13). This state is shown in state 13 of FIG. 12.

The reference point identification unit 23 then reads out the LRF information 41 from the storage unit 12. In the LRF information 41, the same reference point identification methods "I001", "I002", "I003" are respectively associated in units of right eye, left eye, and mouth. Thus, the reference point identification unit 23 identifies the reference point of the detection target point of the right eye based on the reference point identification method "I001", identifies the reference point of the detection target point of the left eye based on the reference point identification method "I002", and identifies the reference point of the detection target point of the mouth based on the reference point identification method "I003", on the normalized image (S14). This state is shown in state 14 of FIG. 12. As shown in the figure, the respective center points of the right eye, the left eye, and the mouth are identified as the reference points in state 14.

The sampling location identification unit 25 then reads out the LRF information 41 from the storage unit 12. In the LRF information 41, the same sampling location identification methods "J001", "J002", "J003" are respectively associated in units of right eye, left eye, and mouth. Thus, the sampling location identification unit 25 identifies the sampling point of the detection target point of the right eye based on the sampling location identification method "J001", identifies the sampling point of the detection target point of the left eye based on the sampling location identification method "J002", and identifies the sampling point of the detection target point of the mouth based on the sampling location identification method "J003", on the normalized image (S15).

This state is shown in state 15 of FIG. 12. As shown in the figure, the sampling points are set in a predetermined range having the reference point of each organ as the center so as to cover each of the left and right eyes and the mouth in state 15.

The feature value extraction unit 26 reads out the LRF information 41 from the storage unit 12. In the LRF information 41, the same feature value extraction methods "K001", "K002", "K003" are respectively associated in units of right eye, left eye, and mouth. Thus, the feature value extraction unit 26 extracts the group of feature values of the detection target point of the right eye based on the feature value extraction method "K001" from the pixel or a group of pixels of the sampling point of the detection target point of the right eye, extracts the group of feature values of the detection target point of the left eye based on the feature value extraction method "K002" from the pixel or a group of pixels of the sampling point of the detection target point of the left eye, and extracts the group of feature values of the detection target point of the mouth based on the feature value extraction method "K003" from the pixel or a group of pixels of the sampling point of the detection target point of the mouth (S16).

In other words, three groups of features values are generated, the group of feature values for the tail point, inner corner point, top lid point, bottom lid point, and eye point of the right eye, the group of feature values for the tail point, inner corner point, top lid point, bottom lid point, and eye point of the left eye, and the group of feature values for the right corner point and left corner point of the mouth, as well as the upper middle points and lower middle points of the upper lip and the lower lip. In other words, three groups of feature values are respectively generated for each reference point (center point) of the right eye, the left eye, and the mouth.

The location information identification unit 29 reads out the LRF information 41 from the storage unit 12. The location information identification unit 29 inputs the group of feature values with respect to the detection target points to the LRF function corresponding to the tail point, the inner corner point, the top lid point, the bottom lid point, and the eye point of the right eye, and identifies the location information of the tail point, the inner corner point, the top lid point, the bottom lid point, and the eye point of the right eye. The location information identification unit 29 inputs the group of feature values with respect to the detection target points to the LRF function corresponding to the tail point, the inner corner point, the top lid point, the bottom lid point, and the eye point of the left eye, and identifies the location information of the tail point, the inner corner point, the top lid point, the bottom lid point, and the eye point of the left eye. The location information identification unit 29 also inputs the group of feature values with respect to the detection target points to the LRF function corresponding to the right corner point and the left corner point of the mouth, as well as the upper middle points and the lower middle points of the upper lip and the lower lip, and identifies the location information of the right corner point and the left corner point of the mouth, as well as the upper middle points and the lower middle points of the upper lip and the lower lip (S17).

Lastly, the region point identification unit 30 reads out the LRF information 41 from the storage unit 12. In the LRF information 41, the same location information generation methods "L001", "L002", "L003" are respectively associated in units of right eye, left eye, and mouth. The region point identification unit 30 identifies the coordinates on the normalized image of the detection target points based on the location information generation method "L001" from the location information of the tail point, the inner corner point, the top lid point, the bottom lid point, and the eye point of the right eye, identifies the coordinates on the normalized image of the detection target points based on the location information generation method "L002" from the location information of the tail point, the inner corner point, the top lid point, the bottom lid point, and the eye point of the left eye, and identifies the coordinates on the normalized image of the detection target point based on the location information generation method "L003" from the location information of the right corner point and the left corner point of the mouth, as well as the upper middle points and the lower middle points of the upper lip and the lower lip (S18).

For example, with respect to the tail point of the right eye, the difference values of the X coordinate value and Y coordinate value indicated by the location information of the tail point are respectively added to the X coordinate value and the Y coordinate value of the reference point (center point) of the right eye. The X coordinate value and the Y coordinate value, which are values obtained as a result of the addition, are the coordinate values on the normalized image of the tail point. Similar processing is also performed on other region points of the right eye, as well as each region point of the left eye and each region point of the mouth to identify the coordinates of each region point of the right eye, the left eye, and the mouth on the normalized image.

This state is shown in state 16 of FIG. 12. As shown, the locations (coordinates) on the normalized images of the tail points, the inner corner points, the top lid points, the bottom lid points, and the eye points of the right eye and the left eye, the right corner point and the left corner point of the mouth, as well as the upper middle points and the lower middle points of the upper lip and the lower lip are identified in state 16.

The coordinate values of each region point on the original image are calculated by affine transformation and the like, for example, from the coordinate values of each region point on the normalized image to identify the coordinates of each region point on the original image.

An image processing device according to at least one embodiment of the present invention relates to an image processing device configured to detect a region point of an object from an image, the image processing device including a reference point identification section configured to identify a reference point with respect to the region point on the image; a feature value extraction section configured to extract a feature value from a pixel of a sampling point or a group of pixels including the pixel for every plurality of sampling points with respect to the reference point, and to extract a group of feature values with respect to the reference point configured by the extracted plurality of feature values corresponding to each of the sampling points; a location information identification section configured to reference correspondence information indicating a correspondence of the group of feature values with respect to the reference point extracted from each pixel or each group of pixels of the plurality of sampling points and location information indicating a relative location of the region point with respect to the reference point to identify location information corresponding to the group of feature values extracted by the feature value extraction section; and a detection side region point identification section configured to assume a location indicated by the location information identified by the location information identification section as the region point of the object.

An image processing method according to at least one embodiment of the present invention relates to an image processing method configured to detect a region point of an object from an image, the image processing method including the steps of identifying a reference point with respect to the region point on the image; extracting a feature value from a pixel of a sampling point or a group of pixels including the pixel for every plurality of sampling points with respect to the reference point, and extracting a group of feature values with respect to the reference point configured by the extracted plurality of feature values corresponding to each of the sampling points; referencing correspondence information indicating a correspondence of the group of feature values with respect to the reference point extracted from each pixel or each group of pixels of the plurality of sampling points and the location information indicating a relative location of the region point with respect to the reference point to identify location information corresponding to the group of feature values extracted in the feature value extracting step; and assuming a location indicated by the location information identified in the location information identifying step as the region point of the object.

According to the configuration described above, the location information identification section references the correspondence information indicating the correspondence of the group of feature values with respect to the reference point extracted from each pixel or each group of pixels of the plurality of sampling points and the location information indicating the relative location of the region point with respect to the reference point to identify the location information corresponding to the group of feature values extracted by the feature value extraction section; and the detection side region point identification section assumes the location indicated by the location information identified by the location information identification section as the region point of the object.

Disclosed is a correlative relationship between the group of feature values extracted from a region including an organ such as eye and mouth on an image, and a relative location of a contour point and a feature point of the organ with respect to a reference point on the image. On the basis of such knowledge, the region point of the object on the image can be detected with high accuracy even with respect to objects which change the shape, by referencing the correspondence information indicating the correspondence of the group of feature values and the location information. In other words, the image processing device and the image processing method have the effect of enabling the region point of the object to be detected with high accuracy even when the shape of the object is changed.

The image processing device according to at least one embodiment of the present invention preferably further includes a sampling location identification section for identifying a location of the sampling point within a range including a region where the region point is assumed to be located in the image.

An information generation device according to at least one embodiment of the present invention relates to an information generation device configured to generate the correspondence information to be referenced by the image processing device, the information generation device including an image acquisition section configured to acquire an image in which a region point of an object is imaged; a reference point identification section configured to identify the reference point with respect to the region point on the image; a feature value extraction section configured to extract a feature value from a pixel of a sampling point or a group of pixels including the pixel for every plurality of sampling points with respect to the reference point, and to extract a group of feature values with respect to the reference point configured by the extracted plurality of feature values corresponding to each of the sampling points; a location information generation section configured to generate the location information indicating a relative location of the region point with respect to the reference point identified by the reference point identification section; and a correspondence information generation section for generating the correspondence information indicating a correspondence of the group of feature values extracted by the feature value extraction section and the location information generated by the location information generation section.

An information generation method according to at least one embodiment of the present invention relates to an information generation method configured to generate the correspondence information to be referenced in the image processing method, the information generation method including the steps of acquiring an image in which a region point of an object is imaged; identifying the reference point with respect to the region point on the image; extracting a feature value from a pixel of a sampling point or a group of pixels including the pixel for every plurality of sampling points with respect to the reference point and extracting a group of feature values with respect to the reference point configured by the extracted plurality of feature values corresponding to each of the sampling points; generating the location information indicating a relative location of the region point with respect to the reference point identified in the reference point identifying step; and generating the correspondence information indicating a correspondence of the group of feature values extracted in the feature value extracting step and the location information generated in the location information generating step.

According to such configuration, the image acquisition section acquires an image in which a region point of an object is imaged; the reference point identification section identifies the reference point with respect to the region point on the image; the feature value extraction section extracts a feature value from a pixel of a sampling point or a group of pixels including the relevant pixel for every plurality of sampling points with respect to the reference point and extracts a group of feature values with respect to the reference point configured by the extracted plurality of feature values corresponding to each of the sampling points; the location information generation section generates the location information indicating a relative location of the region point with respect to the reference point identified by the reference point identification section; and the correspondence information generation section generates the correspondence information indicating a correspondence of the group of feature values extracted by the feature value extraction section and the location information generated by the location information generation section.

Thus, an effect in that the correspondence information to be referenced by the image processing device can be generated is obtained. Since the group of feature values and the location information have a correspondence, as described above, the region point of the object can be detected with high accuracy by using the generated correspondence information.

In the information generation device according to at least one embodiment of the present invention, the correspondence information generation section preferably generates the correspondence information using regression analysis.

The information generation device according to at least one embodiment of the present invention preferably further includes an input section configured to receive an operation instruction from a user, and learning side region point identification section configured to identify the region point of the object on the image based on the operation instruction input to the input section.

In the information generation device according to at least one embodiment of the present invention, the image acquisition section acquires region point location information indicating the location of the region point associated with the image along with the image, and the information generation device preferably further comprises a learning side region point identification section configured to identify the region point of the object on the image based on the location indicated by the region point location information.

The image processing device and the information generation device may be realized with a computer. In this case, by operating the computer as each section of the image processing device and the information generation device, a control program for realizing the image processing device and the information generation device with the computer and a computer-readable recording medium recorded with such a program are also encompassed within the scope of the present invention.

[Supplement]

The present invention is not limited to the embodiment described above, and various changes can be made within a scope defined by the claims. In other words, embodiments obtained by combining technical means appropriately changed within the scope defined by the claims are also encompassed within the technical scope of the present invention.

Lastly, each block of the region point detection device 1 and the LRF learning device 2, in particular, the control unit 11 and the control unit 16 may be configured by a hardware logic, or may be realized by software using the CPU in the following manner.

In other words, the region point detection device 1 and the LRF learning device 2 include a CPU (Central Processing Unit) for executing a command of the control program for realizing each function, a ROM (Read Only Memory) stored with the program, a RAM (Random Access Memory) for developing the program, a storage device (recording medium) such as a memory for storing the program and the various types of data and the like. The object of at least one embodiment of the present invention can also be achieved by providing to the region point detection device 1 and the LRF learning device 2 a recording medium, in which the program code (executable format program, intermediate code program, source program) of the control program of the region point detection device 1 and the LRF learning device 2, which are the software for realizing the functions described above, is computer-readably recorded, and having the computer (or CPU or MPU) read out and execute the program code recorded on the recording medium.

The recording medium may be any non-transitory computer readable medium, for example, a tape series such as a magnetic tape and a cassette tape, a disc series such as a magnetic disc including a floppy (registered trademark) disc/hard disc and an optical disc including a CD-ROM/MO/MD/DVD/CD-R, a card series such as an IC card (include a memory card)/optical card, a semiconductor memory series such as a mask ROM/EPROM/EEPROM/flash ROM, and the like.

The region point detection device 1 and the LRF learning device 2 may be configured to be connectable with the communication network, and the program code may be provided through the communication network. The communication network is not particularly limited, and for example, Internet, Intranet, Extranet, LAN, ISDN, VAN, CATV communication network, virtual private network, telephone line network, mobile communication network, satellite communication network, and the like may be used. A transmission medium configuring the communication network is not particularly limited, and for example, wired line such as IEEE 1394, USB, power line carrier, cable TV line, telephone line, ADSL line, and the like, infrared light such as IrDA and remote controller, or wireless line such as Bluetooth (registered trademark), 802.11 wireless, HDR, portable telephone line, satellite line, terrestrial digital network, and the like can be used. The present invention can also be realized with a mode of a computer data signal embedded in a carrier wave in which the program code is embodied with electronic transmission.

The present invention can be used for the image processing device for detecting a predetermined region point of an object on an image. More specifically, the present invention can be used for the image processing device for detecting from the image a predetermined region point of an object which changes the shape varyingly.

The invention claimed is:

1. An image processing device configured to detect a region point of an object from an image, the image processing device comprising a computer program product, tangibly embodied in a non-transitory computer readable storage medium, the computer program product comprising instructions operable to cause a processing unit to execute a program to control the image processing device to operate as:
   a reference point identification section configured to identify a reference point with respect to the region point on the image;
   a feature value extraction section configured to extract:
      a group of feature values with respect to the reference point from a group of pixels comprising a pixel for each of a plurality of sampling points;
   a location information identification section configured to:
      reference correspondence information indicating a correspondence of the group of feature values with respect to a reference point of another image and location information indicating a relative location of a region point with respect to the reference point in the other image; and
      identify another location information corresponding to the group of feature values extracted by the feature value extraction section based on the correspondence information; and
   a detection side region point identification section configured to identify a location indicated by the other location information identified by the location information identification section as the region point of the object.

2. The image processing device according to claim 1, further comprising a sampling location identification section configured to identify a location of each of the sampling point within a range comprising a region where the region point is assumed to be located in the image.

3. An information generation device configured to generate the correspondence information to be referenced by the image processing device according to claim 1, the information generation device comprising:
   an image acquisition section configured to acquire an image in which a region point of an object is imaged;
   a reference point identification section configured to identify a reference point with respect to the region point on the image;
   a feature value extraction section configured to extract:
      a group of feature values with respect to the reference point from a group of pixels comprising a pixel for each of a plurality of sampling points;

a location information generation section configured to generate location information indicating a relative location of the region point with respect to the reference point identified by the reference point identification section; and a correspondence information generation section configured to generate correspondence information indicating a correspondence of the group of feature values extracted by the feature value extraction section and the location information generated by the location information generation section.

4. The information generation device according to the claim 3, wherein the correspondence information generation section is configured to generate the correspondence information using regression analysis.

5. The information generation device according to claim 3, further comprising an input section configured to receive an operation instruction from a user; and a learning side region point identification section configured to identify the region point of the object on the image based on the operation instruction input to the input section.

6. The information generation device according to claim 3, wherein the image acquisition section is configured to acquire region point location information indicating the location of the region point associated with the image along with the image; and the information generation device further comprises a learning side region point identification section configured to identify the region point of the object on the image based on the location indicated by the region point location information.

7. The information generation device according to claim 4, further comprising:

an input section configured to receive an operation instruction from a user; and a learning side region point identification section configured to identify the region point of the object on the image based on the operation instruction input to the input section.

8. The information generation device according to claim 4, wherein:

the image acquisition section is configured to acquire region point location information indicating the location of the region point associated with the image along with the image; and the information generation device further comprises a learning side region point identification section configured to identify the region point of the object on the image based on the location indicated by the region point location information.

9. An information generation device configured to generate the correspondence information to be referenced by the image processing device according to claim 2, the information generation device comprising:

an image acquisition section configured to acquire an image in which a region point of an object is imaged;

a reference point identification section configured to identify the reference point with respect to the region point on the image;

a feature value extraction section configured to extract:
    a group of feature values with respect to the reference point from a group of pixels comprising a pixel for each of a plurality of sampling points;
a location information generation section configured to generate location information indicating a relative location of the region point with respect to the reference point identified by the reference point identification section; and a correspondence information generation section for generating correspondence information indicating a correspondence of the location information and the group of feature values.

10. An image processing method for detecting a region point of an object from an image, the image processing method comprising:

identifying a reference point with respect to the region point on the image; extracting:
    a group of feature values with respect to the reference point from a group of pixels comprising a pixel for each of a plurality of sampling points
referencing correspondence information indicating a correspondence of the group of feature values with respect to a reference point of another image and location information indicating a relative location of a region point with respect to the reference point in the other image and identifying, based on the correspondence information, another location information corresponding to the group of feature values; and identifying a location indicated by the other location information as the region point of the object.

11. An information generation method for generating the correspondence information to be referenced in the image processing method according to claim 10, the information generation method comprising:

acquiring an image in which a region point of an object is imaged;

identifying a reference point with respect to the region point on the image;

extracting a group of feature values with respect to the reference point from a group of pixels comprising a pixel for each of a plurality of sampling points;

generating location information indicating a relative location of the region point with respect to the reference point; and generating correspondence information indicating a correspondence of the group of feature values and the location information.

12. A non-transitory computer-readable medium having stored thereon, a control program including instructions which when executed on a computer causes the computer to perform the image processing method according to claim 10.

13. A non-transitory computer-readable medium having stored thereon, a control program including instructions which when executed on a computer causes the computer to perform the information generation method according to claim 11.

14. A non-transitory computer-readable medium having stored thereon, a control program including instructions which when executed on a computer causes the computer to perform the image processing method according to claim 10, wherein each of the sampling point is located within a range comprising a region where the region point is assumed to be located in the image.

15. A non-transitory computer-readable medium having stored thereon, a control program including instructions which when executed on a computer causes the computer to operate the information generation method according to claim 11 further including generating the correspondence information using regression analysis.

16. A non-transitory computer-readable medium having stored thereon, a control program including instructions which when executed on a computer causes the computer to perform the information generation method according to claim 11 and further including instructions which when executed on a computer causes the computer to:

receive as an input an operation instruction from a user; and identify the region point of the object on the image based on the operation instruction input by the user.

17. A non-transitory computer-readable medium having stored thereon, a control program including instructions which when executed on a computer causes the computer to perform the information generation method according to claim 11, wherein:

acquiring an image further comprises acquiring region point location information indicating the location of the region point associated with the image along with the image; and generating the location information further comprises learning side region point identification by identifying the region point of the object on the image based on the location indicated by the region point location information.

\* \* \* \* \*